United States Patent
Vinski et al.

(10) Patent No.: US 9,651,659 B2
(45) Date of Patent: May 16, 2017

(54) METHODS AND SYSTEMS FOR DETERMINING VEHICLE POSITION IN AN AUTOMATIC VEHICLE IDENTIFICATION SYSTEM

(71) Applicant: Kapsch TrafficCom AG, Vienna (AT)

(72) Inventors: Lila Vinski, Markham (CA); Japjeev Kohli, Waterloo (CA); Alastair Malarky, Petersburg (CA)

(73) Assignee: Kapsch TrafficCom AG, Vienna (AT)

( * ) Notice: Subject to any disclaimer, the term of this patent is extended or adjusted under 35 U.S.C. 154(b) by 342 days.

(21) Appl. No.: 14/456,540

(22) Filed: Aug. 11, 2014

(65) Prior Publication Data

US 2015/0054676 A1    Feb. 26, 2015

(30) Foreign Application Priority Data

Aug. 26, 2013    (CA) ..................................... 2824703

(51) Int. Cl.
    *G01S 13/74*    (2006.01)
    *G01S 13/82*    (2006.01)
    *G08G 1/01*    (2006.01)
    *G08G 1/017*    (2006.01)
    *G08G 1/052*    (2006.01)

(52) U.S. Cl.
    CPC .............. *G01S 13/74* (2013.01); *G01S 13/82* (2013.01); *G08G 1/017* (2013.01); *G08G 1/0116* (2013.01); *G08G 1/052* (2013.01)

(58) Field of Classification Search
    CPC ....... G01S 13/74; G01S 13/82; G08G 1/0116; G08G 1/017; G08G 1/052

USPC .......................................................... 342/51
See application file for complete search history.

(56) References Cited

U.S. PATENT DOCUMENTS

| | | |
|---|---|---|
| 5,278,563 A | 1/1994 | Spiess |
| 5,406,275 A | 4/1995 | Hassett et al. |
| 5,675,342 A | 10/1997 | Sharpe |
| 5,677,927 A | 10/1997 | Fullerton et al. |
| 5,724,169 A | 3/1998 | LaGasse |
| 6,219,613 B1 | 4/2001 | Terrier et al. |
| 9,599,703 B2 | 3/2017 | Vinski et al. |
| 2005/0179580 A1 | 8/2005 | Cong et al. |
| 2007/0296578 A1 | 12/2007 | Duff |
| 2008/0252293 A1 | 10/2008 | Lagae et al. |

(Continued)

OTHER PUBLICATIONS

Extended European Search Report received for EP Patent Application No. 14174025.8, mailed on Jan. 21, 2015, 9 pages.

(Continued)

*Primary Examiner* — Timothy A Brainard
(74) *Attorney, Agent, or Firm* — Fiala & Weaver P.L.L.C.

(57) ABSTRACT

Methods of estimating vehicle location in a roadway using an automatic vehicle identification system are described. The methods involve receiving a set of response signals from a vehicle-mounted transponder at points in time and determining a range rate of the transponder relative to the antenna at each point in time; identifying a minima in the magnitude of the range rate; estimating a first position of the transponder at a first time corresponding to the occurrence of the minima; estimating a velocity of the vehicle based upon one or more of the determined range rates; and estimating a second position of the transponder based upon the first position and the velocity.

27 Claims, 6 Drawing Sheets

(56) References Cited

U.S. PATENT DOCUMENTS

| | | |
|---|---|---|
| 2009/0122830 A1 | 5/2009 | Chomiki |
| 2009/0231161 A1* | 9/2009 | Malarky .............. G07B 15/063 340/933 |
| 2009/0303004 A1 | 12/2009 | Tuttle |
| 2010/0123558 A1 | 5/2010 | Park et al. |
| 2010/0237998 A1 | 9/2010 | Kohli et al. |
| 2015/0054675 A1 | 2/2015 | Vinski et al. |

OTHER PUBLICATIONS

Extended European Search Report received for EP Patent Application No. 14174026.6, mailed on Jan. 28, 2015, 6 pages.

* cited by examiner

METHODS AND SYSTEMS FOR DETERMINING VEHICLE POSITION IN AN AUTOMATIC VEHICLE IDENTIFICATION SYSTEM

CROSS-REFERENCE TO RELATED APPLICATION(S)

This application claims priority to Canadian Patent Application No. 2,824,703 filed on Aug. 26, 2013, the entirety of which is incorporated by reference herein.

FIELD OF THE INVENTION

The present application relates to intelligent transportation systems (ITS) with automatic vehicle identification, such as may be used in electronic toll collection (ETC) systems, and, in particular, to methods and systems for determining the position of a vehicle in a road using an automatic vehicle identification system.

BACKGROUND OF THE INVENTION

Intelligent transportation systems, such as ETC systems, use radio frequency (RF) communications between roadside readers and transponders within or attached to vehicles. The readers form part of an automatic vehicle identification system for uniquely identifying vehicles in an area, such as a toll plaza. Each reader emits a coded identification signal, and when a transponder enters into communication range and detects the reader, the transponder sends a response signal. The response signal contains transponder identification information, including a unique transponder ID. In the United States, current ITS-based, and in particular ETC-based, RF communication systems are licensed under the category of Location and Monitoring Systems (LMS) through the provisions of the Code of Federal Regulations (CFR) Title 47 Part 90 Subpart M.

Vehicle-mounted transponders may either be active or passive. Active transponders contain a battery that powers the transponder. Each transponder listens for a trigger pulse or signal from a roadside reader and, upon sensing one, generates and transmits a response signal. Passive transponders rely upon energy supplied by the roadside reader in the form of a continuous wave RF signal. The continuous wave signal energizes the transponder and the transponder transmits its response signal by way of backscatter modulation of the continuous wave signal. Passive transponders may or may not include a battery in some implementations.

In some situations, the road stations are designed to be "open road", also known as "multi-lane free-flow", meaning that communications are conducted at highway speed and there are no physical lane separations so vehicles are not constrained. In ETC systems this occurs with no gates, which means that transactions occur quickly, and also means that there is no gate or barrier that prevents a vehicle without a valid transponder from traversing the toll plaza area. Open road ETC systems rely upon ex post facto enforcement. For example, in many implementations an image is captured of each vehicle's license plate area. The image capture depends on a vehicle detection mechanism, such as a light curtain or magnetic loop for detecting vehicle presence in the roadway. The vehicle detection and image capture point is often outside of the RF capture zone within which the vehicle-mounted transponder communicates with the ETC system. The ETC system may be tasked with correlating captured license plate images with processed transponder-based toll transactions to determine whether any of the vehicle license plate images belong to a vehicle that did not complete a successful electronic toll transaction. That vehicle's owner may then be sent an invoice for the toll amount.

In other ITS stations, the station may be measuring vehicle characteristics such as weight, or volume, or speed, and the system is tasked with correlating the instrument measurements with processed transponder-based transactions to associate the measurements to the vehicles. Image capture may also be used in such stations.

The challenge in any open road system is to quickly and accurately correlate vehicle information from sensors, like license plate images, with the transponder communication transaction. In ETC systems it is particularly important that the detected vehicles are correlated with processed toll transactions in order to identify which vehicle, if any, did not pay a toll via a transponder. One of the challenges in all these systems is to accurately estimate the path travelled by a vehicle associated with a transponder that has completed a transaction, so that the vehicle's position can be correlated to the other sensors, e.g. a vehicle identified by the vehicle detection system used by the image capture system.

BRIEF DESCRIPTION OF THE DRAWINGS

Reference will now be made, by way of example, to the accompanying drawings which show embodiments of the present invention, and in which.

Similar reference numerals are used in different figures to denote similar components.

DESCRIPTION OF SPECIFIC EMBODIMENTS

In one aspect, the present application describes a method of determining a range rate of a vehicle-mounted backscatter transponder in a roadway using an automatic vehicle identification system, the system including an antenna defining a coverage area for communicating with the backscatter transponder, the range rate being a rate of change of a distance between the transponder and the antenna. The method includes transmitting, via the antenna, a continuous wave signal having a carrier frequency; receiving a modulated reflected response signal from the transponder, wherein the modulation is at a modulation frequency; converting the modulated reflected response signal to a downconverted signal by mixing the modulated reflected response signal with the carrier frequency; bandpass filtering the downconverted signal to pass a bandpass filtered signal containing at least the modulation frequency; applying a non-linear amplitude transfer function to the bandpass filtered signal to remove modulation and produce a modulation-suppressed signal; measuring the frequency of the modulation-suppressed signal; and determining the range rate based upon a Doppler shift corresponding to the measured frequency of the modulation-suppressed signal.

In another aspect, the present application describes a reader for determining a range rate of a vehicle-mounted backscatter transponder in a roadway. The reader includes a transmitter to generate a continuous wave signal having a carrier frequency; an antenna to transmit the continuous wave signal and to receive a modulated reflected response signal from the transponder, wherein the modulation is at a modulation frequency, and wherein the range rate is a rate of change of a distance between the transponder and the antenna; a mixer to mix the modulated reflected response signal with the carrier frequency to produce a downconverted signal; a bandpass filter to filter the downconverted signal to pass a bandpass filtered signal containing at least the modulation frequency; a non-linear amplitude transfer function to produce a modulation-suppressed signal when the function is applied to the bandpass filtered signal to remove modulation; and a frequency measurer to measure the frequency of the modulation-suppressed signal and to determine the range rate from the measured frequency.

In one aspect, the present application describes a method of estimating vehicle location in a roadway using an automatic vehicle identification system, the system including an antenna defining a coverage area for communicating with a transponder mounted to a vehicle in the roadway. The method includes receiving a set of response signals from the transponder at points in time and determining a range rate of the transponder relative to the antenna at each point in time; identifying a minima in the magnitude of the range rate; estimating a first position of the transponder at a first time corresponding to the occurrence of the minima; estimating a velocity of the vehicle based upon one or more of the determined range rates; and estimating a second position of the transponder based upon the first position and the velocity.

In another aspect, the present application describes an automatic vehicle identification system for identifying the position in a roadway of a vehicle. The system comprises an antenna for communicating with a transponder mounted to the vehicle in the roadway; a transceiver for broadcasting a continuous wave signal over the antenna and for receiving response signals from the transponder; a memory storing vehicle position locating instructions; and a processor, which when executing the vehicle position locating instructions, is configured to determine a range rate of the transponder relative to the antenna based upon response signals received at points in time, identify a minima in the magnitude of the range rate, estimate a first position of the transponder at a first time corresponding to the occurrence of the minima, estimate a velocity of the vehicle based upon one or more of the determined range rates, and estimate a second position of the transponder based upon the first position and the velocity.

In yet a further aspect, the present application describes a non-transitory computer-readable medium storing processor-executable instructions which, when executed, cause a processor to carry out one of the methods described herein.

Other aspects and features of the present invention will be apparent to those of ordinary skill in the art from a review of the following detailed description when considered in conjunction with the drawings.

Figure 1:
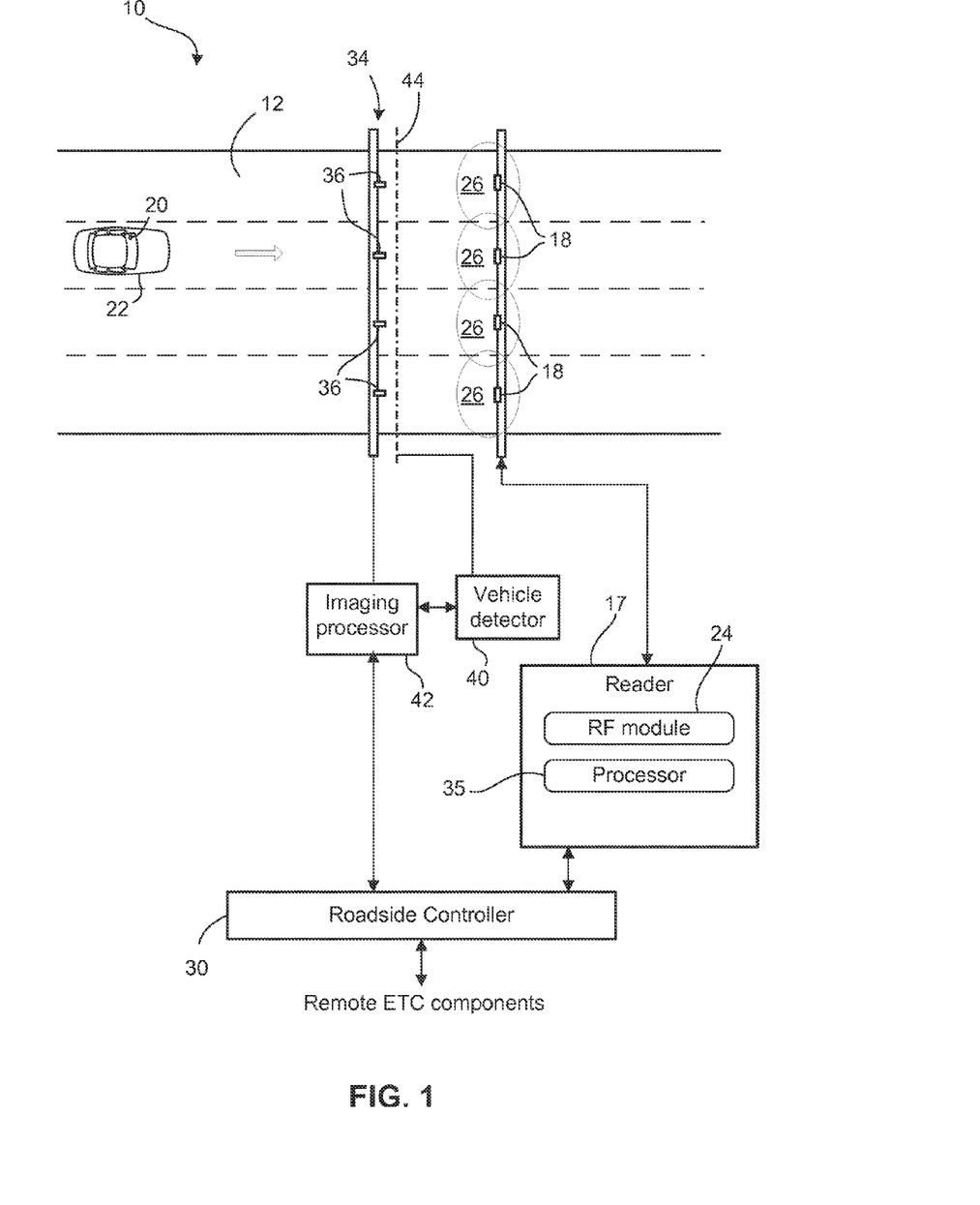
FIG. 1 shows, in block diagram form, an example electronic toll collection (ETC) system.

Reference is first made to FIG. 1, which shows, in block diagram form, an example electronic toll collection (ETC) system 10. The ETC system 10 is employed in connection with a roadway 12 having one or more lanes for vehicular traffic. The arrow indicates the direction of travel in the roadway 12. For diagrammatic purposes, a vehicle 22 is illustrated in the roadway 12. In some instances, the roadway 12 may be an access roadway leading towards or away from a toll highway. In other instances, the roadway 12 may be the toll highway.

Vehicle 22 is shown in FIG. 1 with a transponder 20 mounted to the windshield. In other embodiments, the transponder 20 may be mounted in other locations.

The ETC system includes antennas 18 connected to an automatic vehicle identification (AVI) reader 17. The reader 17 generates signals for transmission by the antennas 18 and processes signals that are received by the antennas 18. The reader 17 includes a processor 35 and one or more radio frequency (RF) modules 24 (one is shown for clarity). In many implementations, each antenna 18 may have a dedicated RF module 24; although in some embodiments an RF module 24 may be shared by more than one antenna 18 through time multiplexing.

The antennas 18 are directional transmit and receive antennas which, in the illustrated embodiment, are oriented to define a series of capture zones 26 extending across the roadway 12 in an orthogonal direction. The arrangement of capture zones 26 define the communication zone within which toll transactions are conducted using an ETC communications protocol.

The ETC system 10 may operate, for example, within the industrial, scientific and medical (ISM) radio bands at 902-928 MHz. For example, the ETC system 10 may conduct communications at 915 MHz. In other embodiments, other bands/frequencies may be used, including 2.4 GHz, 5.9 GHz, etc.

In this embodiment, the ETC system 10 operates using a passive backscatter transponder. The ETC system 10, and in particular the reader 17 and antennas 18, continuously poll the capture zones 26 using time division multiplexing or frequency division multiplexing or code division multiplexing to be able to suppress or ignore signals from overlapping capture zones 26. The polling may include broadcasting a continuous wave RF signal and awaiting a detected response signal from any transponder that happens to be within the capture zone 26. The response signal generally includes a modulated reflected signal from the transponder. In some cases each of the antennas 18 may include a separate transmit antenna and receive antenna. In some other cases, each antenna 18 includes a single antenna used for transmission and reception and the transmit and receive paths are coupled to the antenna 18 through a circulator or other signal splitting/coupling device.

In the ETC system 10, vehicles are detected when they enter the capture zones 26 and the vehicle-mounted transponder 20 responds to the RF signal broadcast by one of the antennas 18. The frequency of the cyclic polling is such that as the vehicle 22 traverses the capture zones 26, the transponder 20 receives and responds to RF signals from the reader 17 a number of times. Each of these poll-response exchanges may be referred to as a "handshake" or "reader-transponder handshake" herein.

Once the reader 17 identifies the transponder 20 as a newly-arrived transponder 20 it will initiate conduct of an ETC toll transaction. This may include programming the transponder 20 through sending a programming signal that the transponder 20 uses to update the transponder information stored in memory on the transponder 20.

The ETC system 10 further includes an enforcement system. The enforcement system may include a vehicle imaging system, indicated generally by the reference numeral 34. The vehicle imaging system 34 is configured to capture an image of a vehicle within the roadway 12, particularly the vehicle license plate. If the vehicle fails to complete a successful toll transaction, then the license plate image is used to identify the vehicle owner and an invoice is sent to the owner. The vehicle imaging system 34 includes cameras 36 mounted so as to capture the front and/or rear license plate of a vehicle in the roadway 12. A vehicle detector 40 defines a vehicle detection line 44 extending orthogonally across the roadway 12. The vehicle detector 40 may include a gantry supporting a vehicle detection and classification (VDAC) system to identify the physical presence of vehicle passing below the gantry and operationally classifying them as to a physical characteristic, for example height. In some example embodiments, the vehicle detector 40 may include loop detectors within the roadway for detecting a passing vehicle. Other systems for detecting the presence of a vehicle in the roadway 12 may be employed, including light curtains, laser detection systems, and other systems.

The imaging processor 42 and vehicle detector 40 are coupled to and interact with a roadside controller 30. The roadside controller 30 also communicates with remote ETC components or systems (not shown) for processing toll transactions. The roadside controller 30 receives data from the reader 17 regarding the transponder 20 and the presence of the vehicle 22 in the roadway 12. The roadside controller 30 initiates a toll transaction which, in some embodiments, may include communicating with remote systems or databases. On completing a toll transaction, the roadside controller 30 instructs the reader 17 to communicate with a transponder 20 to indicate whether the toll transaction was successful. The transponder 20 may receive a programming signal from the reader 17 advising it of the success or failure of the toll transaction and causing it to update its memory contents. For example, the transponder 20 may be configured to store the time and location of its last toll payment or an account balance.

The roadside controller 30 may receive data from the vehicle imaging system 34 and/or the vehicle detector 40 regarding vehicles detected at the vehicle detection line 44. The roadside controller 30 controls operation of the enforcement system by coordinating the detection of vehicles with the position of vehicles having successfully completed a toll transaction. For example, if a vehicle is detected in the roadway at the vehicle detection line 44 in a particular laneway, the roadside controller 30 evaluates whether it has communicated with a vehicle that has completed a successful toll transaction and whose position corresponds to the position of the detected vehicle. If not, then the roadside controller 30 causes the imaging processor 42 to capture an image of the detected vehicle's license plate or, if already captured upstream, then the roadside controller 30 may initiate an enforcement process, such as an automatic or manual license plate identification process followed by billing. The license plate, once identified, may be correlated to the same license place identified at another entry/exit point in order to calculate the appropriate toll amount for billing.

The vehicle detection line 44 may lie outside the capture zones 26. The ETC system 100 needs to determine the likely position or path of a transponder with which it has communicated to determine when and where that transponder would likely have crossed the vehicle detection line 44. Then it can correlate transponders with vehicle images.

There are some existing solutions for determining vehicle location in an ETC system. One is to provide multiple sets of roadside readers to conduct narrow beam sweeping as vehicle approach the capture zones. Using readers on either side of the roadway, the intersecting beams to which a transponder responds give an indication of likely position. This solution requires the installation of additional roadside equipment and may not be suitable for all installations, particularly passive backscatter systems, since it requires a long lead time into the zone, narrow quick moving beams, and may rely upon RSSI measurements.

Another solution is to use additional roadside receivers to receive the transponder transmissions in conjunction with monopulse antennas. These antennas permit direction of arrival to be determined and with two of these the location of the vehicle can be determined. This solution requires the installation of additional roadside equipment and may not be suitable for all installations. It may be better suited to an active transponder system since in a passive transponder system the reader transmission picked up by the receivers will swamp out the transponder signals and degrade the monopulse operation. There are also solutions aimed at determining the lane in which a vehicle is likely travelling. So-called "voting" algorithms make a lane assignment decision based upon the number of handshakes completed with each antenna, sometimes using a weighting algorithm or other techniques. These solutions, however, only indicate the likely lateral position of a vehicle in the roadway at the time the vehicle is traversing the capture zones 26.

In accordance with one aspect of the present application, the ETC system 10 determines the Doppler shift associated with signals received by the antennas 18 from the transponder 20. The Doppler shift correlates to a range rate, i.e. the rate at which the distance between the transponder 20 and the antenna 18 is changing; in other words, the transponder speed towards or away from the antenna (note that the antennas 18 are typically elevated above the roadway and the vehicle moves tangential to the antenna 18). The range rate reaches a zero-crossing point when the transponder passes under the gantry holding the antenna such that it is then moving away from the antenna rather than towards the antenna. Accordingly, if the ETC system 10 determines the zero-crossing point of a transponder's range rate, it then knows the point at which it crosses under the gantry. Using one or more previous (or later) range rate measurements from previous (or later) transponder signals, the velocity of the vehicle may then be estimated at prior (or later) points in time, thereby allowing for estimation of a likely path of the vehicle towards (or away from) the antenna. In some of the following examples, the vehicle detection point is presumed to be upstream from the capture zones; thus, the ETC system 10 seeks to estimate the vehicle position at an earlier point in time based upon range rate measurements from transponder signals. Nonetheless, it will be appreciated that similar techniques may be used to determine position downstream at a later point in time using later range rate measurements.

In one example, the zero-crossing point and a single earlier range rate measurement is used to determine a range of velocity estimates (based on a bounded range of transponder heights, and a bounded range of angles of travel towards the antenna and lateral offsets from the antenna), which, assuming constant velocity, correlate to a range of estimate vehicle positions at previous points in time. This range of path and speed estimates is then used to estimate likely vehicle position at time of crossing the vehicle detection line. The estimate of vehicle position at the time of crossing the vehicle detection line may then be correlated to physically detected vehicle data.

In another example, multiple range rate measurements are determined and corresponding velocity estimates determined for those points in time. Using curve-fitting, the vehicle's velocity and position at various points in time may then be estimated, with the range estimates being constrained by bounds on transponder height, angles of travel, and lateral offsets of the vehicle path from the antenna. In some cases, two sets of estimates may be determined corresponding to signals received by two of the antennas. The two sets of estimates may then be compared to find points of intersection among the ranges of estimated paths/velocities to arrive at a more accurate subset of estimates and may also be used to determine the angle of travel across the road.

In yet another example, the range-rate-based position estimation process is combined with other position locating systems, such as a lane assignment system, to improve accuracy of the position estimate.

Range Rate Determination

The first difficulty that arises in implementing embodiments of the position locating system is determining the range rate for a transponder. In an ETC system, the antenna is stationary and the RFID device (transponder) is in motion; however similar issues would arise in the case of a moving reader/antenna and a stationary RFID device, or in the case of both the reader and RFID device moving.

In a backscatter-based system, the reader broadcasts an RF signal towards the RFID device and receives back a reflected signal. The RFID device imposes modulation onto the reflected signal, which is detected and demodulated by the reader.

In the case of vehicular systems of the type discussed herein, particularly at highway speeds, the Doppler shift is not constant with time and manifests as a large time-varying phase shift over the duration of a single modulation packet from the RFID device. This makes recovery of the modulation and detection of the Doppler shift challenging. Measuring Doppler shift in conventional radar or such systems typically involves directly measuring the phase shift of a reflected signal relative to a transmitted signal. By measuring that phase shift over time, the Doppler shift can be used to determine the speed of the RFID device and/or changes in speed.

In the case of vehicle-mounted RFID, the phase of the received signal includes the reflected signal from the RFID device, but also distortion components that introduce errors in the phase measurements. Distortion can arise from transmit leakage into the receiver, reflections from other items, non-idealities in the receiver signal/circuit path like DC offsets, multi-path reflections of stationary and moving objects, and reflection of the signal from vehicles, including the vehicle with the RFID device.

A high signal-to-noise ratio (SNR) is typically required to directly measure phase with sufficient accuracy to determine Doppler shift. With backscatter RFID, because of the modulation imposed on the reflected signal and the variability of modulation rate between RFID devices, there is little SNR available for direct measurements of phase shift of the received reflected signal.

In accordance with one aspect of the present application, Doppler shift and/or range rate may be determined by exploiting the fact that backscatter modulation in RFID devices manifests itself as bipolar amplitude modulation of the received signal. At the reader, the reflected signal is downconverted to baseband and bandpass filtered to pass the modulated portion of the Doppler-shifted reflected signal. That filtered signal is then adjusted through application of a non-linear amplitude transfer function that serves to effectively remove the modulation and leave a modified signal from which the Doppler shift can be directly measured.

Figure 2:
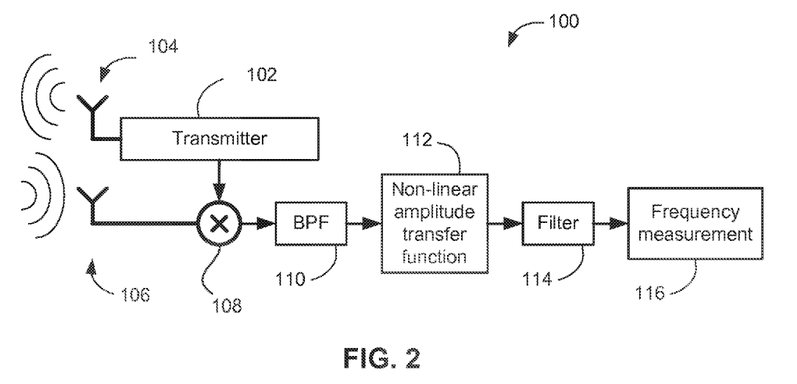
FIG. 2 shows, in block diagram form, a simplified block diagram of an RFID reader for determining Doppler shift in a backscatter RFID.

Reference is now made to FIG. 2, which shows a simplified block diagram of an RFID reader 100 for determining Doppler shift in a backscatter RFID system. The RFID reader 100 includes a transmitter 102 and a transmit antenna 104. The RFID reader 100 further includes a receive antenna 106, although in some embodiments the transmit antenna 104 and the receive antenna 106 are the same antenna, which is then coupled to the transmitter 102 and receiver circuitry through a circulator or other signal splitting/combining device.

The transmitter 102 generates and broadcasts an RF signal using the transmit antenna 104. The transmitted RF signal may be defined as:

$$A_T \cdot \cos(w_T \cdot t)$$

In this expression, $A_T$ is the transmit signal magnitude, $w_T$ is the frequency in radians, and t is the instantaneous time.

An RFID device (not shown) receives the RF signal and returns a reflected signal. The RFID device imposes modulation on the reflected signal. The reflected signal is received by the RFID reader 100 via the receive antenna 102. The reflected signal from any object in the field may be expressed as:

$$A_T \cdot (L_x(t))^2 \cdot O_x(t) \cdot \left( \cos\left( w_T \left( t - 2\frac{d_x(t)}{c} \right) \right) \right) = R_x(t) \cdot \cos((w_T + w_x(t)) \cdot t)$$

The index x denotes the object from which the signal is reflected, which may include stationary or moving objects, including vehicles. In the above expression, $L_x(t)$ is the RF power loss for a signal between transmission and receipt of the reflection. It includes the gain of the subsystem antennas in the direction of the object as well as propagation effects. If the object is moving it will be time dependent. It is unipolar (i.e. it can only have positive or negative values) within the region of interest. $O_x(t)$ is the amount of reflection by the object in the direction of the receive antenna. It is time dependent if the object is moving. It is also unipolar in the region of interest.

The term $d_x(t)$ denotes the distance (range) between the object and the receive antenna. It is time dependent if the object is in motion. The speed of RF propagation is given by c. The term $R_x(t)$ is the magnitude of the received signal, and it includes $A_T \cdot (L_x(t))^2 \cdot O_x(t)$. The Doppler shift in radians is given by $w_x(t)$ if the object is moving. Expressed in Hz, the Doppler shift is $f_x(t)$. Note that:

$$f_x(t) = -2 \cdot \frac{f_T}{c} \cdot \frac{d(d_x(t))}{dt}$$

In this expression, $f_T$ is the frequency of the transmit signal and $d(d_x(t))/dt$ is the differential of the range with respect to time, i.e. the range rate or velocity of the object relative to the receive antenna.

The reflected signal from the RFID device itself may be expressed as:

$$m_r(t) \cdot A_T \cdot (L_r(t))^2 \cdot O_r(t) \cdot \left(\cos\left(w_T\left(t - 2\frac{d_r(t)}{c}\right)\right)\right) =$$

$$m_r(t) \cdot R_r(t) \cdot \cos((w_T + w_r(t)) \cdot t)$$

In the above expression, the term $m_r(t)$ denotes the modulation imposed by the RFID device on the reflected signal. The index r indicates that the terms relate to the RFID device, as opposed to other objects in the field. Note that the item of particular interest is $w_r(t)$, which is the Doppler shift radian frequency for the signal from the moving RFID device. In Hz, this may be expressed as:

$$f_r(t) = -2 \cdot \frac{f_T}{c} \cdot \frac{d(d_r(t))}{dt}$$

Referring still to FIG. 2, the received reflected signal at the receive antenna 106 is downconverted using a carrier frequency signal (plus some constant phase shift θ) from the transmitter 104 and a combiner 108. The downconverted signal may be expressed as:

$m_r(t) \cdot R_r(t) \cdot \cos((w_T + w_r(t)) \cdot t) \cdot \cos(w_T \cdot t + \theta)$ This may also be expressed as:

$=0.5 \cdot m_r(t) \cdot R_r(t) \cdot \cos(2w_T \cdot t + w_r(t) \cdot t + \theta) + 0.5 \cdot m_r(t) \cdot R_r(t) \cdot \cos(w_r(t) \cdot t - \theta)$ The first term is at twice the carrier frequency and the second term is at baseband with respect to the carrier. It will be noted that the second term includes the time-dependent modulation $m_r(t)$ and the time-dependent changes in reflectivity and power loss resulting from movement of the RFID device. It will also be appreciated that the mixing/downconversion will produce other products, generally at higher multiples of the carrier frequency. For the purposes of the present analysis, these terms are ignored since they will be filtered from the downconverted signal.

Note that the received signal will include other reflected signals in addition to the modulated reflected signal from the RFID device. After downconversion, these other signals will be given by:

$0.5 \cdot R_x(t) \cdot (\cos(2w_T \cdot t + w_x(t) \cdot t + \theta) + \cos(w_x(t) \cdot t - \theta)) = 0.5 \cdot R_x(t) \cdot (\cos(2w_T \cdot t + w_x(t) \cdot t + \theta)) + 0.5 \cdot R_x(t) \cdot \cos(w_x(t) \cdot t - \theta)$ As noted above, the modulation $m_r(t)$ from an RFID device may be represented as a bipolar phase modulation or a bipolar amplitude modulation, with some mean offset. In the case of bipolar amplitude modulation, the modulation is expressed as:

$m_r(t) = a_1 + a_m \cdot H_r(t)$

In this expression, $a_1$ is the mean offset, $a_m$ is the magnitude of the signal change, and $H_r(t)$ is one of two states: $(1, -1)$. As a specific case, in on-off keying $a_1 \geq a_m$.

Bipolar phase modulation may be expressed as:

$m_r(t) = a_1 + a_2 \cdot \cos(G_r(t) + \phi)$

In the above expression, Gr(t) can take one of two states: $(0, \pi)$. This expression is then equivalent with:

$$m_r(t) = a_1 + a_2 \cdot \cos(G_r(t)) \cdot \cos(\varphi) = a_1 + a_m \cdot H_r(t)$$

In other words, the bipolar phase modulation (so defined) may be treated the same as bipolar amplitude modulation.

If the above expression for bipolar modulation is substituted into the expression for the downconverted modulated reflected signal, then it becomes:

$0.5 \cdot (a_1 + a_m \cdot H_r(t)) \cdot R_r(t) \cdot (\cos(2w_T \cdot t + w_r(t) \cdot t + \theta) + \cos(w_r(t) \cdot t - \theta)) = 0.5 \cdot (a_1 + a_m \cdot H_r(t)) \cdot R_r(t) \cdot (\cos(2w_T \cdot t + w_r(t) \cdot t + \theta)) + 0.5 \cdot a_1 \cdot R_r(t) \cdot \cos(w_r(t) \cdot t - \theta) + 0.5 \cdot a_m \cdot H_r(t) \cdot R_r(t) \cdot \cos(w_r(t) \cdot t - \theta)$ The following observation may be made regarding the frequency components of some of the time-dependent terms in the above expressions. For any reasonable Doppler rate, it will be appreciated that:

$$\frac{d(H_r(t))}{dt} \gg \frac{d(f_x(t))}{dt} > \frac{d(R_x(t))}{dt} \approx \frac{d(R_r(t))}{dt}$$

In other words, the rate of change of the signal magnitude due to changes in propagation loss and reflectivity due to movement of the object or RFID device will be less than the rate of change in the Doppler shift, which in turn is much less than the modulation rate.

Accordingly, referring again to FIG. 2, a bandpass filter 110 may be used to filter the downconverted signals and pass the modulation frequencies, rejecting any terms that contain multiples of the carrier frequency (too high) or any terms that are not modulated (too low). With such a bandpass filter 110, we eliminate both terms of the signal reflected from other objects, and eliminate two terms of the modulated reflected signal from the RFID device, and are left with:

$0.5 \cdot a_m \cdot H_r(t) \cdot R_r(t) \cdot \cos(w_r(t) \cdot t - \theta)$

This band-pass filtered signal may further be expressed as:

$K_m(t) \cdot \cos(w_r(t) \cdot t - \theta)$

The term $K_m(t)$ is a time-dependent amplitude function that contains both the effects of signal attenuation and the RFID-imposed modulation $H_r(t)$, thereby meaning it is bipolar. The signal further includes the periodic amplitude function $\cos(w_r(t) \cdot t - \theta)$, which is also bipolar and is solely dependent upon the Doppler frequency.

The modulation may then be removed from the bandpass-filtered downconverted reflected signal by applying a non-linear amplitude transfer function 112. Examples of the non-linear amplitude transfer function 112 include a square law function or an absolute magnitude function. The non-linear amplitude transfer function 112 addresses the fact that both phase contributors have bipolar magnitudes. By eliminating the bipolar behaviour of the $K_m(t)$ term, the modulation is effectively removed as a phase contributor from the signal for the purpose of analyzing the Doppler effect.

An example is now described with respect to the square law function. The unipolar output after squaring the band-pass-filtered downconverted signal is:

$$(K_m(t))^2 \cdot \cos^2(w_r(t) \cdot t - \theta) = (K_m(t))^2 \cdot (1 + \cos(2w_r(t) \cdot t - 2\theta))$$

$$= (K_m(t))^2 + (K_m(t))^2 \cdot \cos(2w_r(t) \cdot t - 2\theta)$$

From the definition above of $K_m(t)$, the following observations may be made:

$$(K_m((t))^2 \propto (L_r(t))^4 \cdot (O_r(t))^2 \cdot (H_r(t))^2$$

But from the definition of $H_r(t)$, the square of it will be equal to 1. Accordingly:

$$(K_m(t))^2 \propto (L_r(t))^4 \cdot (O_r(t))^2$$

A filter 114 is then applied to the resulting squared signal. The filter 114 may include a low-pass filter that suppresses any residual modulation frequencies or noise content. A bandpass filter may also be used to suppress the stand alone term $(K_m(t))^2$. Because the highest frequency that the filter 114 is required to pass is the Doppler frequency, the filter bandwidth will be very much less than any filter required for demodulation and hence a high SNR can be obtained even when the SNR in the modulation bandwidth is poor. The effect of the filter will be to average the amplitude function $(K_m(t))^2$ so what is output from the filter 114 is the signal:

$$K_a(t) \cdot \cos(2w_r(t) \cdot t - 2\theta)$$

In this expression, $K_a(t)$ is a relatively slowly-varying average amplitude function dependent upon $(L_r(t))^4 \cdot (O_r(t))^2$. It is therefore unipolar and non-zero. The term $\cos(2w_r(t) \cdot t - 2\theta)$ is a periodic amplitude function at twice the Doppler frequency, and is bipolar. As a result, the Doppler frequency may then be determined in a frequency measurement 116 stage by, for example, detecting zero crossings of the filtered squared signal.

In another example, the non-linear amplitude transfer function 112 is implemented using an absolute magnitude function. In this example, in one implementation the polarity is discarded from the signal output from the bandpass filter 110. The result of such an operation is:

$$|K_m(t)| \cdot |\cos(w_r(t) \cdot t - \theta)| = |(L_r(t))^2 \cdot O_r(t)| \cdot |H_r(t)| \cdot |\cos(w_r(t) \cdot t - \theta)|$$

As in the case of the square law, the magnitude of the modulation function $H_r(t)$ is equal to 1, so it may be eliminated from the analysis.

Applying the filter 114 to suppress residual modulation frequency or noise content improves the SNR. The effect of such filtering is to average the amplitude function $|K_m(t)|$ such that the filtered magnitude signal is given by:

$$K_b(t) \cdot |\cos(w_r(t) \cdot t - \theta)|$$

The term $K_b(t)$ is a slowly-varying average amplitude function dependent upon $|(L_r(t))^2 \cdot O_r(t)|$, and it is therefore unipolar and non-zero if an RFID signal is present. It will be appreciated that the Doppler component, $|\cos(w_r(t) \cdot t - \theta)|$, exhibits two amplitude minima every period of $f_r(t)$. By, for example, measuring the time between the minima the Doppler frequency is directly obtained.

It may also be observed that the term $|\cos(w_r(t) \cdot t - f)|$ gives the same answer for negative or positive Doppler shifts. This ambiguity may be resolved through multiple observations of the Doppler frequency to assess whether it is increasing or decreasing, which correspond to the RFID device moving away or moving towards the receive antenna 106, respectively.

In some embodiments, the modulation function $H_r(t)$ is not restricted to the set (−1, 1). For example, the function may have time-shaped bits. Nevertheless, the above-described processes may still be applied, provided the average amplitude of positive and negative states are equal and as long as the modulation rate remains much higher than the Doppler rate to allow for the filtering process.

In some embodiments, the transmit signal may be phase (or bipolar amplitude) modulated and the process will still lead to the Doppler frequency provided that the modulation is passed through the down-conversion filter and then removed (averaged out) by the post-down-conversion non-linear amplitude transfer function.

It will be appreciated that the above-described method requires only a single receive path, i.e. it does not require the phase of the incoming signal to be determined and it removes the modulation to determine the Doppler shift directly.

The above-described process may be modified, in some embodiments, using quadrature down-conversion. For example, both the in-phase and quadrature paths may be independently processed (band-pass filtered, modified by non-linear transfer function, and filtered), using e.g. the magnitude function approach, to result in signals such as:

$$I = K_b(t) \cdot |\cos(w_r(t) \cdot t)|$$

$$Q = K_b(t) \cdot |\sin(w_r(t) \cdot t)| = K_b(t) \cdot |\cos(\pi/2 - w_r(t) \cdot t)|$$

The in-phase component will have minima at $w_r(t) \cdot t = 0 + n \cdot \pi$, and the quadrature component will have minima at $w_r(t) \cdot t = \pi/2 + n \cdot \pi$. By comparing the time difference between the minima on the two channels, a known fraction of Doppler period is determined and, hence, the Doppler frequency.

The Doppler frequency measurement is not restricted to using minima Since frequency is the rate of change of phase with time, by determining the phase change over any part of a transmission and knowing the time, the frequency can be measured.

Location Determination

As described above, the ETC system may determine the range rate (speed of the RFID device relative to the reader antenna) using RFID modulated reflected signals for each of the signals. This data may be used to determine, i.e. estimate, the vehicular speed and likely position of the vehicle and RFID device at the times during which the reflected signals were sent and, based on that data, the likely position of the vehicle at other points in time.

The easiest case is one in which the vehicle is constrained to travel in a known longitudinal path without wide lateral variation in position. This may occur in the case of a set of rail tracks or in the case of a single lane highway or roadway.

Figure 3:
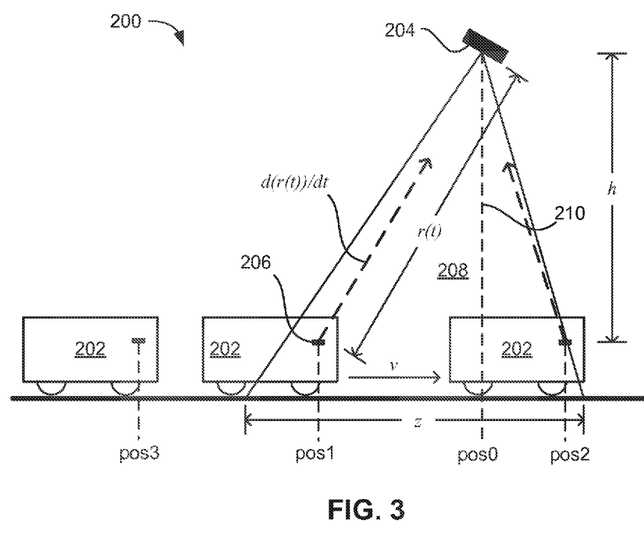
FIG. 3 shows, in block diagram form, a side-view of an example ETC system capture zone.

Reference is now made to FIG. 3, which illustrates a side view of an example ETC system 200, in which vehicles are constrained to travel in a single lane. The constraint is such that the system is modeled in 2-dimensions with a vehicle 202 travelling a fixed vector passing below an elevated antenna 204. The vehicle 202 is equipped with a transponder 206 mounted to its windshield. In other embodiments, the transponder 206 may be mounted elsewhere on the vehicle 202. In general, transponders are usually located between about 3 to 8 feet above the surface of the roadway.

The antenna 204 is a directional antenna that defines a coverage area 208 (i.e. capture zone) within which it is generally able to communicate with and receive response signals from transponders 206.

It will be appreciated that as the vehicle 202 travels through the coverage area 208 at vehicular roadway speed, the transponder 206 receives transmit signals from the antenna 204 and responds by modulating a reflected signal. As described above, the reader (not illustrated) may determine a range rate for the transponder 206 based upon the modulated reflected signal received at the antenna 204. Based on one or more range rate measurements, the roadway velocity of the vehicle 202 may be estimated. With an estimated position at one point in time and an estimated velocity vector, the position of the transponder 206, and thus the vehicle 202, may then be estimated at other points in time.

Accordingly, the system 100 determines (i.e. estimates) the position of the transponder 206 at one point in time. One point that may be used in some embodiments is the point at which the transponder 206 passes directly under the antenna 204. At this point, the range rate crosses zero. In other embodiments, different positions may be used. For example a vehicle detection sensor, such as a loop detector, light curtain or scanner may be used to pinpoint the location of the vehicle at a given point in time. Note that the latter techniques would still need to be correlated with transponder communications to associate range rate measurements to the vehicle position, whereas the range rate zero-crossing approach is already correlated to a particular transponder 206.

The range rate at any point in time a function of four variables: the vehicle velocity (v); the height (h) between the antenna and the transponder; the distance (d(t)) of the transponder along the vehicle trajectory; and the communication carrier frequency ($f_r$) of the backscatter RFID system.

Assume that at time t=0, d(t)=0. Then the following expressions generally apply:

$$d(t) = t \cdot v$$

$$r(t1) = \sqrt{d(t1)^2 + h^2}$$

$$f_d(t1) = -2 \cdot \frac{f_r}{c} \cdot \frac{d(r(t1))}{dt}$$

In the above expression, r(t1) is the range at time t1, $f_d$(t1) is the Doppler measurement at time t1, and c is the speed of RF propagation. Accordingly, it will be appreciated that, with the Doppler measurement at time t1 calculated from the transponder response signal, the system 100 may then determine the rate of change of r(t1), i.e. the range rate.

The size z of the coverage area 208 is generally known. It is not a fixed value since, depending on the age of the transponder 206, its mounting configuration, environmental factors, etc., different transponders 206 may be able to communicate with the antenna 206 over slightly different sized zones. Nonetheless, a bounded range z of reasonable position values is known for a given installation. For example, a coverage area 208 that is nominally 12 feet long may practically be considered as being between about 8 and 15 feet long.

The length of time that the transponder 206 is in communication with the antenna 204 is also known. Thus the time it takes the vehicle 202 to traverse the coverage area 208 is known. Therefore, based on the range of size z values, there is a range of possible v values for the vehicle 202. This gives a reasonable set of bounded estimates for velocity v, which then are iteratively tested for fit with the Doppler measurement(s).

As an example, suppose that at time t1, a range rate of 12.89 m/s is calculated from the Doppler measurement. The antenna 204 is mounted 17 ft above the roadway and the transponder height is assumed to be 4 ft. The coverage area 208 size z is between 8 and 15 feet. The transponder 206 is in communication for 115.5 ms. The range rate zero-crossing point occurs at a time of t0=t1+80.85 ms. Based on a bounded range of velocities v between 80 and 150 kph, the velocities may be tested to determined which velocity results in a range rate of 12.89 m/s at time t1. The resulting estimated velocity v in this example situation is 96.5 kph.

Accordingly, with this estimated velocity, and estimated positions of the vehicle 202 at times t0 and t1, the vehicle position at other times, such as t2 or t3, may then be estimated.

It has been determined empirically that the transponder height has a nearly negligible impact on position estimates since the antenna height tends to be much larger than the transponder height. Nonetheless, the transponder height may be treated as a bounded range, thereby resulting in a range of estimated velocity values.

With more than one range rate measurement, more than one estimate for velocity may be obtained. The velocities thus obtained may be averaged, or a curve may be fit to the velocity estimates to account for possible velocity changes as the vehicle traverses the coverage area 208.

Figure 4:
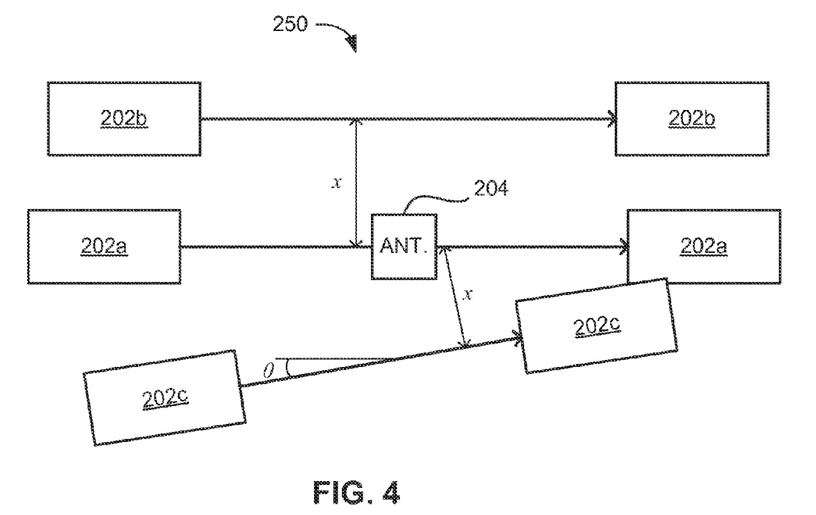
FIG. 4 shows a simplified block diagram of a planar view of vehicles paths through an example ETC system capture zone.

A more complex problem is determining the position of a vehicle in a multi-lane environment in which it cannot be assumed that the vehicle travels in a constrained path. Reference is now made to FIG. 4, which shows an overhead view of one example of an ETC system 250. Three vehicles 202, denoted 202a, 202b, and 202c, are shown. Each vehicle 202 is shown in a first position (Pos1) and a second position (Pos2). One antenna 204 is shown in this example.

The first vehicle 202a is shown travelling parallel to the edge of the roadway with no lateral offset from the antenna 204, as in the constrained travel example illustrated previously. The second vehicle 202b is shown travelling parallel to the edge of the roadway offset from the antenna 204. The distance of the offset is a cross-track distance x. The relationship between the range r, height h, distance d, and cross-track distance x may now be expressed as:

$$r(t1) = \sqrt{d(t1)^2 + h^2 + x^2}$$

Note that there is still a minima in range rate that occurs where the vehicle direction of motion/path is orthogonal to the antenna.

The third vehicle 202c is shown travelling at an angle θ from parallel to the centerline of the roadway and offset from the antenna 204 by the cross-track distance x.

It has been experimentally noted that, like antenna height h, the cross-track distance for reasonable ranges of x has a near negligible impact on the correlation between range-rate measurements and velocity/distance estimates. Nonetheless, a bounded range of cross-trace distances x may be assumed, resulting in a bounded range of velocity/distance estimates for a given range-rate measurement.

Recall that in a multi-lane system, there are multiple antennas that span the roadway, and that the system selects the antenna with the best (e.g. highest number of) communications with the vehicle-mounted transponder. That antenna will usually tend to be the antenna to which the vehicle passes most closely, although such is not necessarily the case depending on environmental factors, antenna age and anomalies, and multipath reflections. Therefore, there is an upper bound of reasonable x values on either side of an antenna, above which it may be presumed that the vehicle would better communicate with another antenna. Similarly, in a multi-lane open road environment, there is an upper bound on the angle θ at which a vehicle is able to travel relative to the roadway centerline without veering off the roadway. In one embodiment, the bounds on the angle θ may be related to the time in the capture zone, since the faster that the vehicle is travelling, the less likely that it is travelling at a large angle θ relative to the centerline.

Accordingly, given a range rate minima at one time t0 and a range rate measurement at one or more other times, t1, we may estimate a bounded region in which the vehicle is likely located at a third time.

Figure 5:
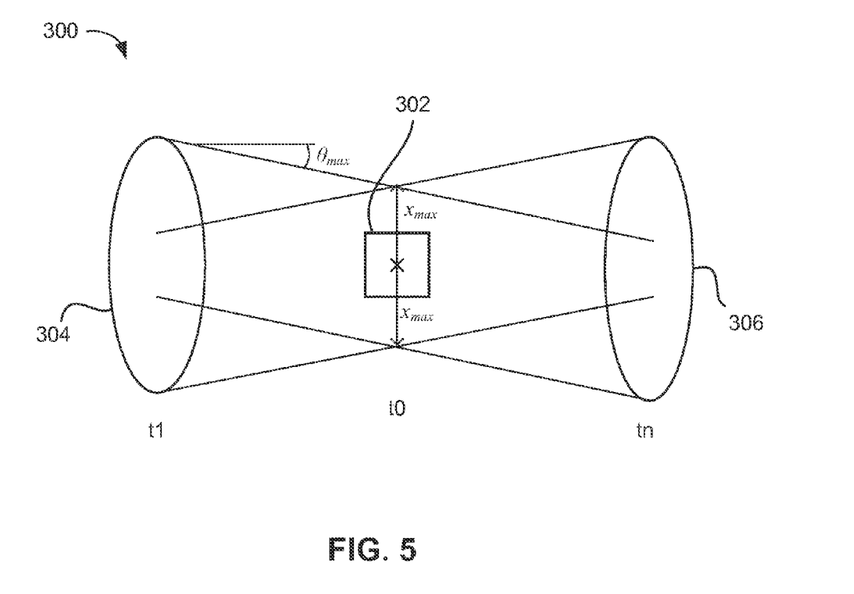
FIG. 5 shows a simplified diagram of a range of position determinations for a vehicle in an ETC system capture zone.

Reference is now made to FIG. 5, which diagrammatically shows an overhead view of a vehicle location system 300. The system 300 includes one antenna 302. A range rate minima is detected at time t0, which corresponds to a location under the antenna 302 or along a cross-track offset x from the antenna orthogonal to the direction of travel. At a time t1, a range rate is calculated based on a Doppler measurement. The bounded set of possible locations is indicated by numeral 304 based on a bounded set of velocities and corresponding possible cross-track offsets x and angles θ corresponding to those velocities. Each location within the bounded set of locations 304 corresponds to a unique combination of velocity v, cross-track offset x and angle θ. Each then (presuming constant velocity and direction of travel) corresponds to a predicted location at time tn. Thus, the system 300 is able to predict the possible locations of the vehicle at a time tn. In this example, at the time tn, the range of possible locations is indicated by reference numeral 306.

In another embodiment, the system 300 evaluates whether it is possible for the vehicle to be in a particular location at a time tn based upon whether that location falls within the bounded set of possible locations. This embodiment may be used to determine whether a physically detected vehicle may be correlated to a transponder-equipped vehicle with which the system 300 has communicated. In yet another embodiment, the system 300 predicts a range of possible times at which the vehicle will reach a vehicle detection line, based on the range of possible velocities v and trajectories (x and θ).

Figure 6:
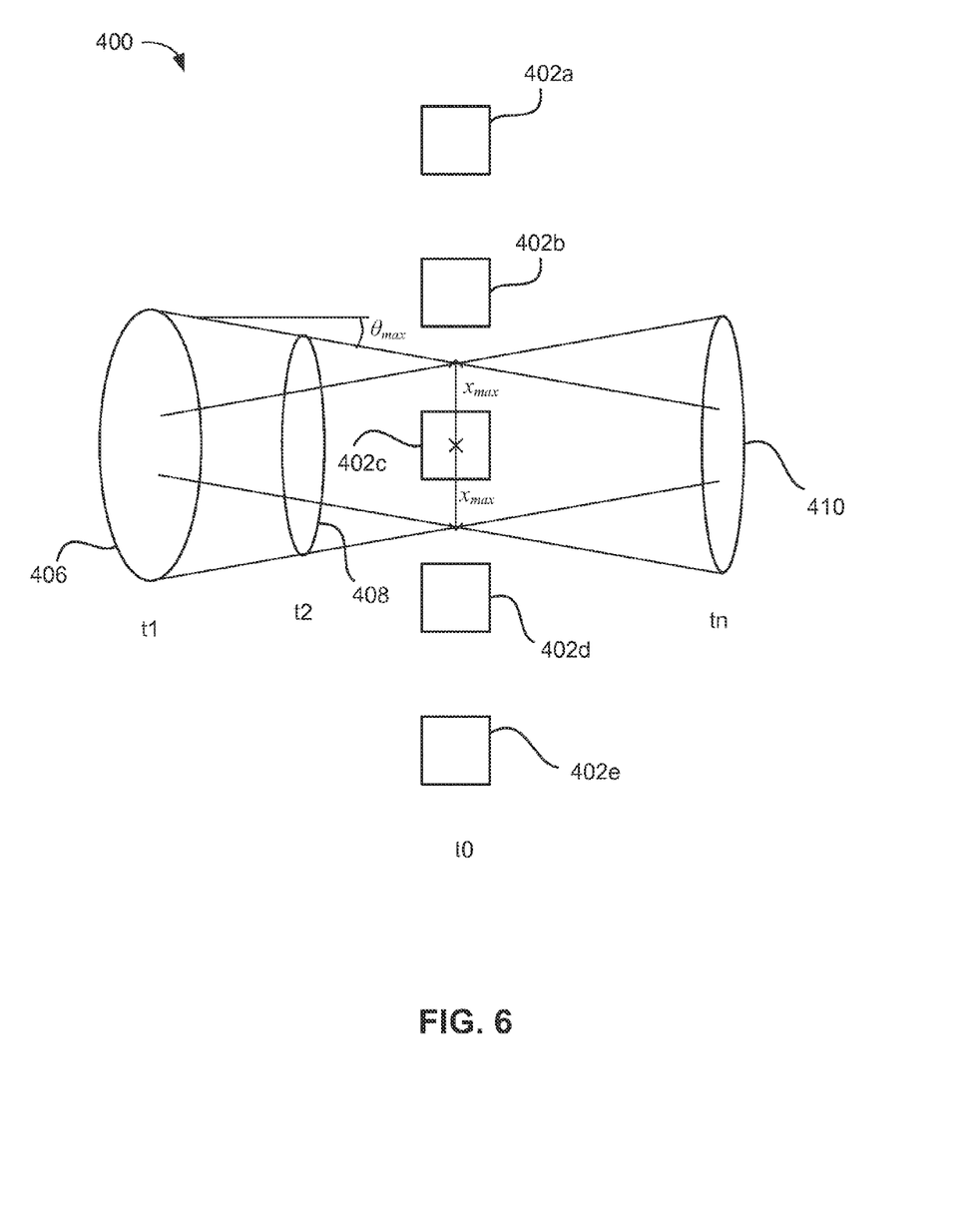
FIG. 6 shows another simplified diagram of a range of position determinations for a vehicle in an ETC system capture zone.

Reference is now made to FIG. 6, which diagrammatically shows an overhead view of a vehicle location system 400 in a multi-lane environment that includes a plurality of antenna 402a, 402b, 402c, 402d, and 402e. In this embodiment, multiple range rate measurements are calculated, corresponding to times t1, t2 and t3. The range of velocities and corresponding positions based upon the first range rate measurement at time t1 is indicated using reference numeral 406. The range of velocities and corresponding positions based upon the second range rate measurement at time t2 is indicated using reference numeral 408. The plurality of range rate measurements assists in narrowing the range of possible velocities that meet the criteria (for velocity, angle, and offset) in both sets of data and, thus, the range of possible locations at the time tn. As a result a narrower range of possible locations 410 at time tn is determined.

In some embodiments, the range rate measurements may be averaged or otherwise combined. In some cases, the calculated bounded set of velocities (and their x and θ values) for one range rate measurement is combined with the corresponding bounded set of velocities (and their corresponding x and θ values) of other range rate measurements to arrive at a subset of possible velocities and their corresponding x and θ values. The combination may take into account possible reasonable acceleration or deceleration between two points in time.

Figure 7:
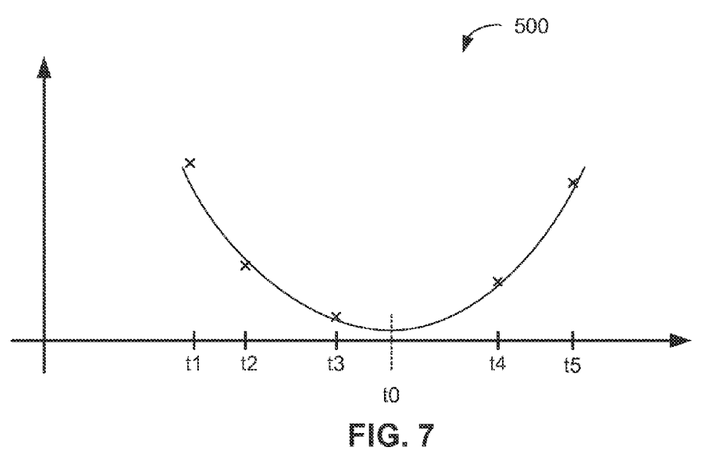
FIG. 7 shows a graph of example range rate magnitude measurements and a curve fit to the data.

Reference is now made to FIG. 7, which shows a graph 500 of range rate calculated versus time. It will be understood that the range rate calculations correspond to (nearly) discrete points in time at which a response signal is received by the system from a transponder. In this example, five range rate calculations are shown at times t1, t2, t3, t4, and t5. Also in this example, it is presumed that the sign of the phase shift is not known from the above measurement analysis, leaving the system 300 with only range rate magnitude at the specific points in time. It will be understood that the measurement times do not necessarily include a measurement at exactly time t0 during which the range rate is zero.

One approach, illustrated in FIG. 7, is to fit a curve to the measured range rate magnitudes and, having found a best fit curve, to identify the time at which that curve is at a minima. This is then identified as time t0. The curve fitting may be based upon fitting a second-degree polynomial, in this example. Least squares may be the basis for finding a best fit, in some implementations.

Figure 8:
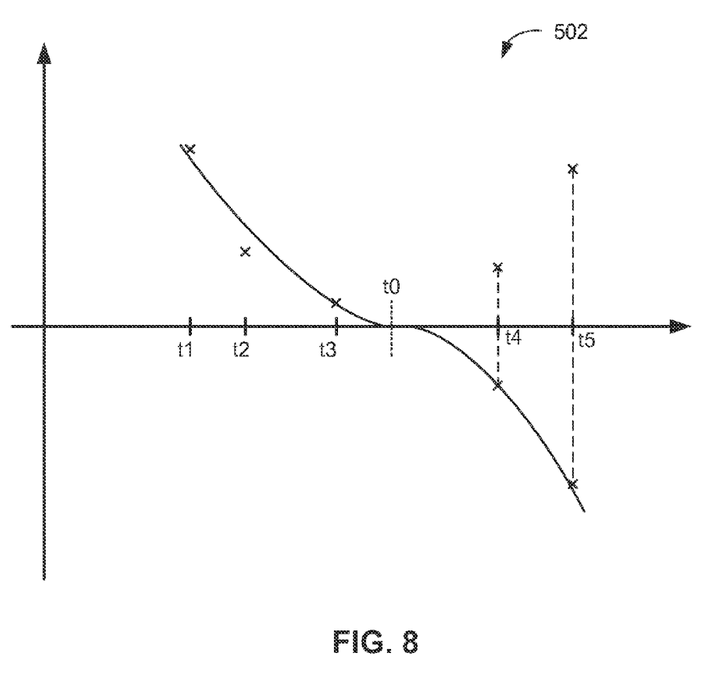
FIG. 8 shows another graph of example range rate measurements with a curve fit to the data.

Another approach, illustrated by a graph 502 shown in FIG. 8, is to iteratively change, starting at the last measurement, the measured range rate magnitude negative and attempt to fit a curve to the data points. This iteration is performed until the best fit is realized. The zero-crossing point and slope may then be determined from the curve. It will be noted that the curve may be a first-degree polynomial in some implementations. In some implementations, the system 300 may attempt to fit a third-degree polynomial to the data points instead of a first-degree polynomial. With the third-degree polynomial the inflection point may correspond to the zero-crossing point. Least squares may be used to identify the best fit.

Figure 9:
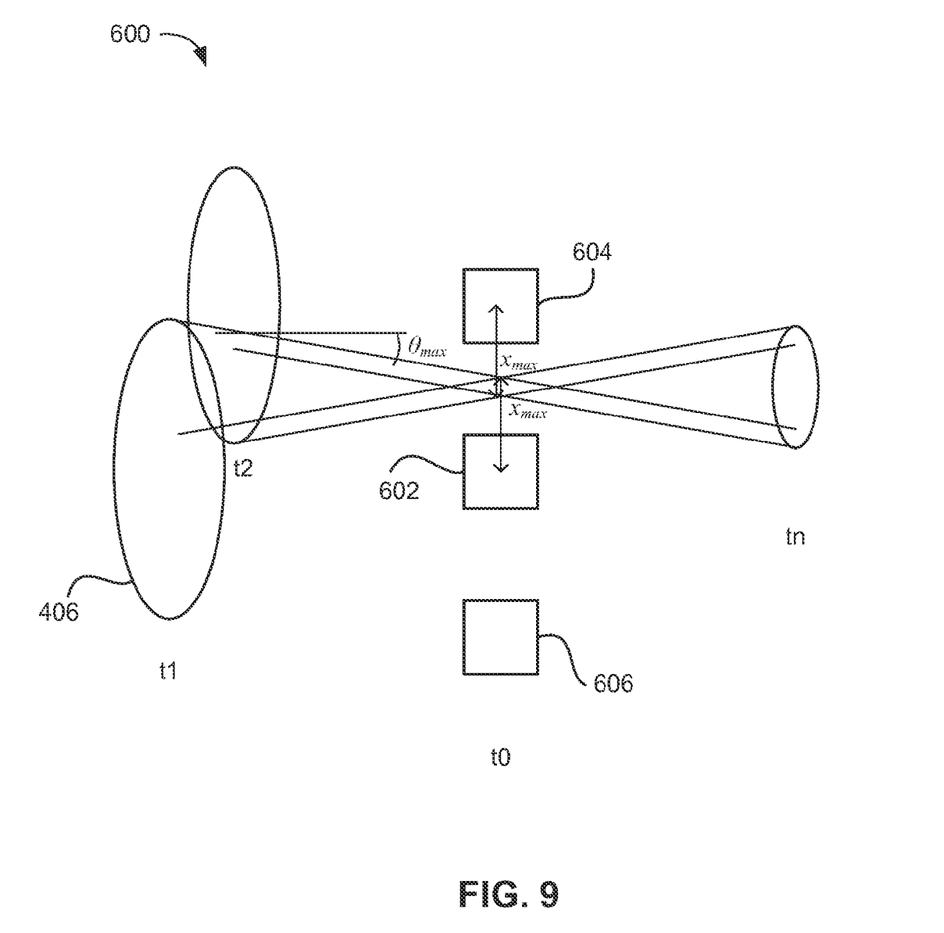
FIG. 9 shows a further simplified diagram of a range of position determinations for a vehicle in a multi-antenna ETC system capture zone.

Referring now to FIG. 9, which shows another overhead view of a vehicle location system 600, it will be noted that the range of possible locations may be further constrained in the case where the vehicle may be presumed to be on one side of an antenna 602, thus reducing the range of cross-track offsets x to one side of the antenna 602. This determination may be based, for example, upon communications received by an adjacent antenna 604 as compared to communications received by an adjacent antenna 606 on the other side of the antenna 602. The determination may be based on relative handshake counts, RSSI measurements, or other such data.

As illustrated in FIG. 9, the range rate measurements taken by both antennas may be used to constrain the possible locations, trajectories and velocities, leading to a more accurate estimate of vehicle location at time tn.

Referring again to FIGS. 1 and 2, the reader 17, RF module 24, roadside controller 30, system 100, or parts thereof, may be implemented by way of programmable integrated circuit components, application-specific integrated circuits, analog devices, or combinations of those components. In some cases, the functions or operations described herein may be implemented by way of processor-executable instructions stored on a processor-readable memory that, when executed, cause one or more processors to carry out those functions or operations. Some of the above described functions may be implemented by the reader 17 and some by the roadside controller 30, depending on the implementation chosen.

The present invention may be embodied in other specific forms without departing from the spirit or essential characteristics thereof. Certain adaptations and modifications of the invention will be obvious to those skilled in the art. Therefore, the above discussed embodiments are considered to be illustrative and not restrictive, the scope of the invention being indicated by the appended claims rather than the foregoing description, and all changes which come within the meaning and range of equivalency of the claims are therefore intended to be embraced therein.

What is claimed is:

1. A method of estimating vehicle location in a roadway using an automatic vehicle identification system, the system including an antenna defining a coverage area for communicating with a transponder mounted to a vehicle in the roadway, the method comprising:
  receiving a set of response signals from the transponder at points in time and determining a range rate of the transponder relative to the antenna at each point in time to obtain a plurality of range rates;
  identifying a minima in the magnitude of the plurality of range rates;
  estimating a first position of the transponder at a first time corresponding to the occurrence of the minima;
  estimating a velocity of the vehicle based upon one or more of the plurality of range rates; and
  estimating a second position of the transponder based upon the first position and the velocity.

2. The method claimed in claim 1, wherein a range rate of the plurality of range rates of the transponder relative to the antenna comprises the rate of change of a distance between the transponder and the antenna, and wherein the antenna is elevated above the roadway.

3. The method claimed in claim 1, wherein determining the range rate of the transponder relative to the antenna at each point in time comprises measuring the Doppler shift in the response signal at each point in time.

4. The method claimed in claim 1, wherein identifying a minima in the magnitude of the plurality of range rates comprises finding a best fit curve using the plurality of range rates.

5. The method of claim 4, wherein finding the best fit curve includes using least squared error to select the best fit curve, and wherein identifying the minima in the magnitude includes finding a zero-crossing point of the best fit curve.

6. The method claimed in claim 1, wherein estimating the velocity comprises selecting a bounded set of velocities and selecting the velocity within the bounded set that corresponds to the plurality of range rates determined to have occurred.

7. The method claimed in claim 6, wherein selecting the bounded set of velocities includes determining the time during which the transponder was in communication with the antenna, determining a bounded range of possible lengths for the coverage area, and determining the bounded set of velocities based upon the bounded range of possible lengths and the time during which the transponder was in communication with the antenna.

8. The method claimed in claim 1, wherein estimating the second position is further based upon a bounded range of cross-track offsets, wherein the cross-track offset is a distance, in a plane parallel to the roadway, between a trajectory of the transponder and a center of the antenna, wherein the distance is orthogonal to the trajectory.

9. The method claimed in claim 1, wherein estimating the second position is further based upon a bounded range of possible angles of a trajectory of the transponder to a centerline of the roadway.

10. The method claimed in claim 1, wherein estimating the velocity comprises estimating the velocity at a second point in time, and wherein the method further comprises estimating a second velocity of the vehicle at another time based upon one or more of the plurality of range rates, and estimating a third position of the transponder based upon the first position and the second velocity.

11. The method claimed in claim 1, further comprising determining a likely position of the transponder at a selected time based upon the estimates for the velocity, the first position and the second position.

12. The method claimed in claim 11, wherein the likely position of the transponder is outside the coverage area.

13. The method claimed in claim 1, further comprising determining a time and a location at which the transponder likely passed a vehicle detection line across the roadway, based upon the estimates for the velocity, the first position and the second position.

14. An automatic vehicle identification system for identifying the position in a roadway of a vehicle, the system comprising:
  an antenna for communicating with a transponder mounted to the vehicle in the roadway;
  a transceiver for broadcasting a continuous wave signal over the antenna and for receiving response signals from the transponder;
  a memory storing vehicle position locating instructions; and
  a processor, which when executing the vehicle position locating instructions, is configured to:
    determine a plurality of range rates of the transponder relative to the antenna based upon response signals received at points in time,
    identify a minima in the magnitude of the plurality of range rates,
    estimate a first position of the transponder at a first time corresponding to the occurrence of the minima,
    estimate a velocity of the vehicle based upon one or more of the plurality of range rates, and
    estimate a second position of the transponder based upon the first position and the velocity.

15. The system claimed in claim 14, wherein a range rate of the plurality of range rates of the transponder relative to the antenna comprises the rate of change of a distance between the transponder and the antenna, and wherein the antenna is elevated above the roadway.

16. The system claimed in claim 14, wherein the processor is configured to determine the range rate of the transponder relative to the antenna at each point in time by measuring the Doppler shift in the response signal at each point in time.

17. The system claimed in claim 14, wherein the processor is configured to identify a minima in the magnitude of the plurality of range rates by finding a best fit curve using the plurality of range rates.

18. The system claimed in claim 17, wherein finding the best fit curve includes using least squared error to select the best fit curve, and wherein the processor identifies the minima in the magnitude by finding a zero-crossing point of the best fit curve.

19. The system claimed in claim 14, wherein the processor is configured to estimate the velocity by selecting a bounded set of velocities and selecting the velocity within the bounded set that corresponds to the plurality of range rates determined to have occurred.

20. The system claimed in claim 19, wherein selecting the bounded set of velocities includes determining the time during which the transponder was in communication with the antenna, determining a bounded range of possible lengths for the coverage area, and determining the bounded set of velocities based upon the bounded range of possible lengths and the time during which the transponder was in communication with the antenna.

21. The system claimed in claim 14, wherein the processor is configured to estimate the second position further based upon a bounded range of cross-track offsets, wherein the cross-track offset is a distance, in a plane parallel to the roadway, between a trajectory of the transponder and a center of the antenna, and wherein the distance is orthogonal to the trajectory.

22. The system claimed in claim 14, wherein the processor is configured to estimate the second position further based upon a bounded range of possible angles of a trajectory of the transponder to a centerline of the roadway.

23. The system claimed in claim 14, wherein the processor is configured to estimate the velocity by estimating the velocity at a second point in time, and wherein the processor is further configured to estimate a second velocity of the vehicle at another time based upon one or more of the plurality of range rates, and to estimate a third position of the transponder based upon the first position and the second velocity.

24. The system claimed in claim 14, wherein the processor is further configured to determine a likely position of the transponder at a selected time based upon the estimates for the velocity, the first position and the second position.

25. The system claimed in claim 24, wherein the likely position of the transponder is outside the coverage area.

26. The system claimed in claim 14, wherein the processor is further configured to determine a time and a location at which the transponder likely passed a vehicle detection line across the roadway, based upon the estimates for the velocity, the first position and the second position.

27. A non-transitory computer-readable medium storing processor-executable instructions which, when executed, cause a processor to carry out the method claimed in claim 1.

\* \* \* \* \*

UNITED STATES PATENT AND TRADEMARK OFFICE
CERTIFICATE OF CORRECTION

PATENT NO. : 9,651,659 B2  
APPLICATION NO. : 14/456540  
DATED : May 16, 2017  
INVENTOR(S) : Lila Vinski et al.

Page 1 of 1

It is certified that error appears in the above-identified patent and that said Letters Patent is hereby corrected as shown below:

In the Specification

In Column 9, Line 65, delete "$m_r(t)=a_1+a_2 \cdot \cos(G_r(t)+\phi)$" and insert -- $m_r(t)=a_1+a_2 \cdot \cos(G_r(t)+\varphi)$ --, therefor.

Signed and Sealed this  
Fifth Day of September, 2017

Joseph Matal  
*Performing the Functions and Duties of the*  
*Under Secretary of Commerce for Intellectual Property and*  
*Director of the United States Patent and Trademark Office*